(12) United States Patent
Miyazaki

(10) Patent No.: US 9,751,508 B2
(45) Date of Patent: Sep. 5, 2017

(54) VEHICLE BRAKE APPARATUS

(75) Inventor: Tetsuya Miyazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 420 days.

(21) Appl. No.: 14/416,343

(22) PCT Filed: Aug. 31, 2012

(86) PCT No.: PCT/JP2012/072224
§ 371 (c)(1),
(2), (4) Date: Jan. 22, 2015

(87) PCT Pub. No.: WO2014/033925
PCT Pub. Date: Mar. 6, 2014

(65) Prior Publication Data
US 2015/0203083 A1  Jul. 23, 2015

(51) Int. Cl.
*B60T 8/1761* (2006.01)
*B60T 13/68* (2006.01)
(Continued)

(52) U.S. Cl.
CPC .............. *B60T 8/1761* (2013.01); *B60T 8/36* (2013.01); *B60T 8/4081* (2013.01); *B60T 8/441* (2013.01);
(Continued)

(58) Field of Classification Search
CPC .......... B60T 8/176; B60T 8/1761; B60T 8/36; B60T 8/4077; B60T 8/4081; B60T 8/441;
(Continued)

(56) References Cited

U.S. PATENT DOCUMENTS 8,888,197 B2 * 11/2014 Miyazaki .............. B60T 8/4081
303/116.2

FOREIGN PATENT DOCUMENTS

JP  2008-290487 A  12/2008
JP  2011-156998 A  8/2011

OTHER PUBLICATIONS

International Search Report issued Dec. 4, 2012 in PCT/JP2012/072224 Filed Aug. 31, 2012.

\* cited by examiner

*Primary Examiner* — Logan Kraft
(74) *Attorney, Agent, or Firm* — Oblon, McClelland, Maier & Neustadt, L.L.P.

(57) ABSTRACT

A holding valve (61) is provided on an individual flow passage (51) connecting a main flow passage (52) and a wheel cylinder (42) to each other. The holding valve (61) permits communication between an upstream side and a downstream side in an open state to transmit the hydraulic pressure from an accumulator (32) to the wheel cylinder (42), and shuts off the communication between the upstream side and the downstream side in a closed state. Moreover, a pressure reducing valve (62) for realizing communication or shutoff between a reservoir (22) and a main flow passage (52) and between the reservoir (22) and the wheel cylinder (42) is provided on a pressure reducing individual flow passage (56) for connecting a reservoir flow passage (57) and the individual flow passage (51) to each other. Then, when a driver carries out a return operation on a brake pedal (10) during antiskid control, a brake ECU (100) inhibits the holding valve (61) in the closed state from shifting to the open state, maintains the holding valve (61) in the open state, and controls the pressure reducing valve (62) corresponding to this holding valve (61) to shift to the open state. As a result, a hydraulic pressure in the main flow passage (52) is decreased via the holding valve (61) and the pressure reducing valve (62) in the open state.

7 Claims, 6 Drawing Sheets

(51) Int. Cl.
*B60T 13/66* (2006.01)
*B60T 8/44* (2006.01)
*B60T 13/14* (2006.01)
*B60T 8/36* (2006.01)
*B60T 8/40* (2006.01)
*B60T 17/18* (2006.01)

(52) U.S. Cl.
CPC .......... *B60T 13/142* (2013.01); *B60T 13/145* (2013.01); *B60T 13/662* (2013.01); *B60T 13/686* (2013.01); *B60T 17/18* (2013.01)

(58) Field of Classification Search
CPC .... B60T 13/142; B60T 13/145; B60T 13/662; B60T 13/686; B60T 17/18
See application file for complete search history.

<LINEAR CONTROL MODE>

<ANTISKID CONTROL>

VEHICLE BRAKE APPARATUS

TECHNICAL FIELD

The present invention relates to a brake device for a vehicle, including a master cylinder for generating a hydraulic pressure in response to an operation by a driver on a brake pedal, a power hydraulic pressure source for generating a hydraulic pressure through drive of a pressure pump, a valve mechanism including a plurality of electromagnetic valves to be controlled by electric signals, for carrying out transmission of the hydraulic pressure output from the master cylinder or the power hydraulic pressure source, a wheel cylinder for applying a braking force to a wheel through the transmission of the hydraulic pressure output from the master cylinder or the power hydraulic pressure source via the valve mechanism, and control means for controlling an operation of the valve mechanism.

BACKGROUND ART

In recent years, there has been proposed a brake device configured to selectively use a hydraulic pressure from a master cylinder and a hydraulic pressure from a pressure pump (accumulator), which is a power hydraulic pressure source. For example, a brake system disclosed in Patent Literature 1 and a brake control device disclosed in Patent Literature 2 have hitherto been known as the brake device of this type. In the brake system and the brake control device, a target hydraulic pressure for each wheel cylinder is set so as to correspond to the hydraulic pressure generated in the master cylinder by a depressing operation by the driver on the brake pedal, and the hydraulic pressure pressurized by the pressure pump is controlled to follow the target hydraulic pressure and to be supplied by driving a linear control valve and various electromagnetic on-off valves. Further, for example, the following technology has been proposed. As in the brake control device disclosed in Patent Literature 2, only a pressure increasing linear control valve for realizing pressure increasing linear control is provided between the power hydraulic pressure source and a main flow passage to which the plurality of wheel cylinders are connected in order to control, in common, hydraulic pressures in the plurality of wheel cylinders. Pressure reducing linear control valves are employed as a part of pressure reducing valves, which are provided on the respective wheels and communicable to a reservoir. In this manner, the number of valves provided for the entire brake device is decreased.

CITATION LIST

Patent Literature

[PTL 1] JP 2011-156998 A
[PTL 2] JP 2008-290487 A

SUMMARY OF INVENTION

In the above-mentioned technology, when the hydraulic pressures in the wheel cylinders are decreased, the pressure reducing valves including the pressure reducing linear control valves communicable to the reservoir are used. In this case, the brake device for a vehicle can be reduced in cost by replacing the expensive pressure reducing linear control valve by the simple electromagnetic on-off valve.

Incidentally, the related-art brake system and brake control device include, as the various electromagnetic on-off valves, for each of brake systems for the respective wheels, a holding valve for at least permitting or shutting off communication between an upstream side connected to the main flow passage to which the hydraulic pressure is transmitted from the power hydraulic pressure source and a downstream side connected to the wheel cylinder, and a pressure reducing valve for permitting or shutting off communication between the wheel cylinder and the reservoir. In the related-art brake system and brake control device, when the brake pedal on which the driver has carried out the depressing operation is operated toward a return direction of reducing the hydraulic pressure in the wheel cylinders, the hydraulic pressures in the wheel cylinders are decreased by opening the pressure reducing valves provided on the brake systems for the respective wheels. Moreover, in the related-art brake system and brake control device, the hydraulic pressure in the main flow passage is decreased via the pressure reducing valves provided on the brake systems for the respective wheels by opening the holding valves provided in the brake systems.

In this case, when the antiskid control is carried out in the related-art brake system and brake control device, the holding valve and the pressure reducing valve are independently controlled for operation in the brake system for the each wheel, and hence there may arise such a state that brake systems controlled to have high pressures and brake systems controlled to have low pressures exist. When the driver operates the brake pedal in the return direction in this state, and, for example, the holding valves provided on the brake systems controlled to have the low pressures are opened in order to decrease the hydraulic pressure in the main flow passage, the high hydraulic pressure may be transmitted from the main flow passage side, thereby influencing the hydraulic pressures in the wheel cylinders. As a result, the driver may feel a sense of discomfort in brake operation feeling.

The present invention has been made in view of the above-mentioned problem, and therefore has an object to provide a brake device for a vehicle configured to generate appropriate braking forces, thereby providing satisfactory brake operation feeling even when a brake pedal is operated toward a return direction during antiskid control.

In order to achieve the object, the brake device for a vehicle according to one embodiment of the present invention includes a master cylinder, a power hydraulic pressure source, a valve mechanism, a wheel cylinder, and control means.

The master cylinder is configured to generate a hydraulic pressure in response to an operation by a driver on a brake pedal. The power hydraulic pressure source is configured to generate a hydraulic pressure through drive of a pressure pump. It should be noted that if the power hydraulic pressure source includes an accumulator, the hydraulic pressure generated by the pressure pump is accumulated in the accumulator. The valve mechanism includes a plurality of electromagnetic valves to be controlled by electric signals, and is configured to carry out transmission of the hydraulic pressure output from the master cylinder or the power hydraulic pressure source. The wheel cylinder is configured to apply a braking force to each of wheels through the transmission of the hydraulic pressure output from the master cylinder or the power hydraulic pressure source via the valve mechanism. The control means is configured to control the operation of the valve mechanism.

In this case, during an abnormal state in which there is a possibility of a leak of a working fluid in any of brake systems for transmitting the hydraulic pressure from the power hydraulic pressure source to the wheel cylinders provided on a front right wheel, a front left wheel, a rear right wheel, and a rear left wheel of a vehicle, the control means may control the holding valves to be in the open state so as to maintain the communication between the wheel cylinders provided on rear right and left wheel sides of the vehicle and the power hydraulic pressure source, and control the holding valves to be in the closed state so as to shut off the communication between the wheel cylinders provided on front right and left wheel sides of the vehicle and the power hydraulic pressure source and to transmit at least the hydraulic pressure from the master cylinder to the wheel cylinders provided on the front right and left wheel sides of the vehicle. Moreover, in this case, the brake device for a vehicle may further include a pressure increasing mechanism. The pressure increasing mechanism is connected to the master cylinder and the power hydraulic pressure source so as to generate a hydraulic pressure having a predetermined ratio with respect to the hydraulic pressure from the master cylinder by using the hydraulic pressure from the power hydraulic pressure source. In this case, the pressure increasing mechanism may be mechanically operated by the hydraulic pressure output from the master cylinder in response to, for example, the operation by the driver on the brake pedal.

The brake device for a vehicle according to one embodiment of the present invention has feature in that the valve mechanism includes: holding valves, which are each an electromagnetic on-off valve, provided for the respective wheels so as to realize at least communication or shutoff between an upstream side to which the hydraulic pressure is transmitted from the power hydraulic pressure source and a downstream side to which the wheel cylinder is connected; pressure reducing valves, which are each an electromagnetic on-off valve, provided in correspondence to the respective holding valves so as to realize at least communication or shutoff between the wheel cylinder and a reservoir; and a pressure increasing valve, which is an electromagnetic valve, for increasing the hydraulic pressure on the upstream side by using the hydraulic pressure from the power hydraulic pressure source. Further, the control means is configured to, during antiskid control for suppressing an excessive slip in a longitudinal direction of a wheel to which the braking force is applied, when the brake pedal subjected to a depressing operation is operated toward a return direction by the driver: inhibit, out of the holding valves provided for the respective wheels, inhibits the holding valve controlled to be in a closed state based on the antiskid control from shifting to an open state; and control the pressure reducing valve provided in correspondence to the holding valve in the open state based on the antiskid control to shift to an open state.

As a result, when the brake pedal subjected to the depressing operation is operated toward the return direction by the driver during the antiskid control, the holding valves in the closed state may be inhibited from shifting to the open state. As a result, the high hydraulic pressure is securely prevented from being transmitted to the wheel cylinders controlled to have low pressures by maintaining the holding valves in the closed state based on the antiskid control. Thus, the braking force applied by the wheel cylinder is securely prevented from fluctuating on the wheel for which the holding valve is controlled to be in the closed state, and the driver may gain satisfactory brake operation feeling.

On the other hand, when the brake pedal subjected to the depressing operation is operated toward the return direction by the driver during the antiskid control, the holding valves in the open state are still maintained in the open state, and the pressure reducing valves provided in correspondence with the holding valves are controlled to shift to the open state. As a result, the high hydraulic pressure on the upstream side of the holding valves is decreased via the holding valves and the pressure reducing valves in the open state. Thus, the high hydraulic pressure has already been transmitted to the wheel cylinder from the upstream side on the wheel on which the holding valve is maintained in the open state, and the hydraulic pressure on the upstream side of the holding valve and the hydraulic pressure in the wheel cylinder on the downstream side of the holding valve may be quickly decreased by controlling the corresponding pressure reducing valve to shift to the open state. As a result, the braking force applied by the wheel cylinder can be quickly released without a fluctuation in the braking force. Thus, the driver may gain satisfactory brake operation feeling.

In this case, when the control means controls all the holding valves to be in the closed state based on the antiskid control, the control means may cancel the inhibition of the shift to the open state in the holding valve provided for the wheel having the maximum hydraulic pressure in the wheel cylinder, and may control the corresponding holding valve to shift to the open state. More specifically, for example, the control means may estimate the hydraulic pressure in the wheel cylinder for each of a front right wheel, a front left wheel, a rear right wheel, and a rear left wheel of a vehicle, and select, based on the estimated hydraulic pressure, the holding valve provided for the wheel having the maximum hydraulic pressure in the wheel cylinder. It should be noted that, in this case, the control means may include hydraulic pressure estimation means for estimating the hydraulic pressure in the wheel cylinder for each of the front right wheel, the front left wheel, the rear right wheel, and the rear left wheel of the vehicle, and selection means for selecting, based on the hydraulic pressures estimated by the hydraulic pressure estimation means, the holding valve provided for the wheel having the maximum hydraulic pressure in the wheel cylinder.

As a result, even under a state in which the control means controls all the holding valves to be in the closed state based on the antiskid control, when the brake pedal subjected to the depressing operation is operated toward the return direction by the driver, the control means may select the holding valve provided for the wheel having the maximum hydraulic pressure in the wheel cylinder, and may cancel the inhibition of this holding valve from shifting to the open state, thereby controlling the holding valve to shift from the closed state to the open state. The control means may further control the pressure reducing valve provided in correspondence to this holding valve to shift to the open state. As a result, even under a state in which the high hydraulic pressure on the upstream side is to be transmitted, the increase in hydraulic pressure after the transmission is relatively small for the wheel cylinder having the maximum hydraulic pressure. Thus, even under a state in which all the holding valves are controlled to be in the closed state based on the antiskid control, when the brake pedal subjected to the depressing operation is operated toward the return direction by the driver, the fluctuation range of the braking force applied by the wheel cylinder may be suppressed to be small, and the driver may gain satisfactory brake operation feeling.

Moreover, in this case, it is preferred that the holding valve in the open state be, for example, the holding valve controlled to be in the open state for a predetermined period or more. In other words, if the period in which the holding valve is opened is shorter than the predetermined period, the hydraulic pressure on the upstream side may not be appropriately decreased due to an influence of a pressure loss (orifice). Thus, the predetermined period is set to such a period that the influence of the pressure loss (orifice) is no long exerted, and the holding valve controlled to be in the open state for the predetermined period or more may be determined to be the holding valve in the open state. A holding valve controlled to be in the open state only for a period less than the predetermined period may be determined not to be the holding valve in the open state.

As a result, the hydraulic pressures on the upstream side and on the downstream side approximately match each other on a wheel on which the holding valve determined to be in the open state in this way is provided, and the pressure can be appropriately decreased via the pressure reducing valve provided in correspondence without a fluctuation in the hydraulic pressure in the wheel cylinder. Thus, the braking force applied by the wheel cylinder can be quickly released without a fluctuation in the braking force. Thus, the driver may gain satisfactory brake operation feeling.

DESCRIPTION OF EMBODIMENTS

Figure 1:
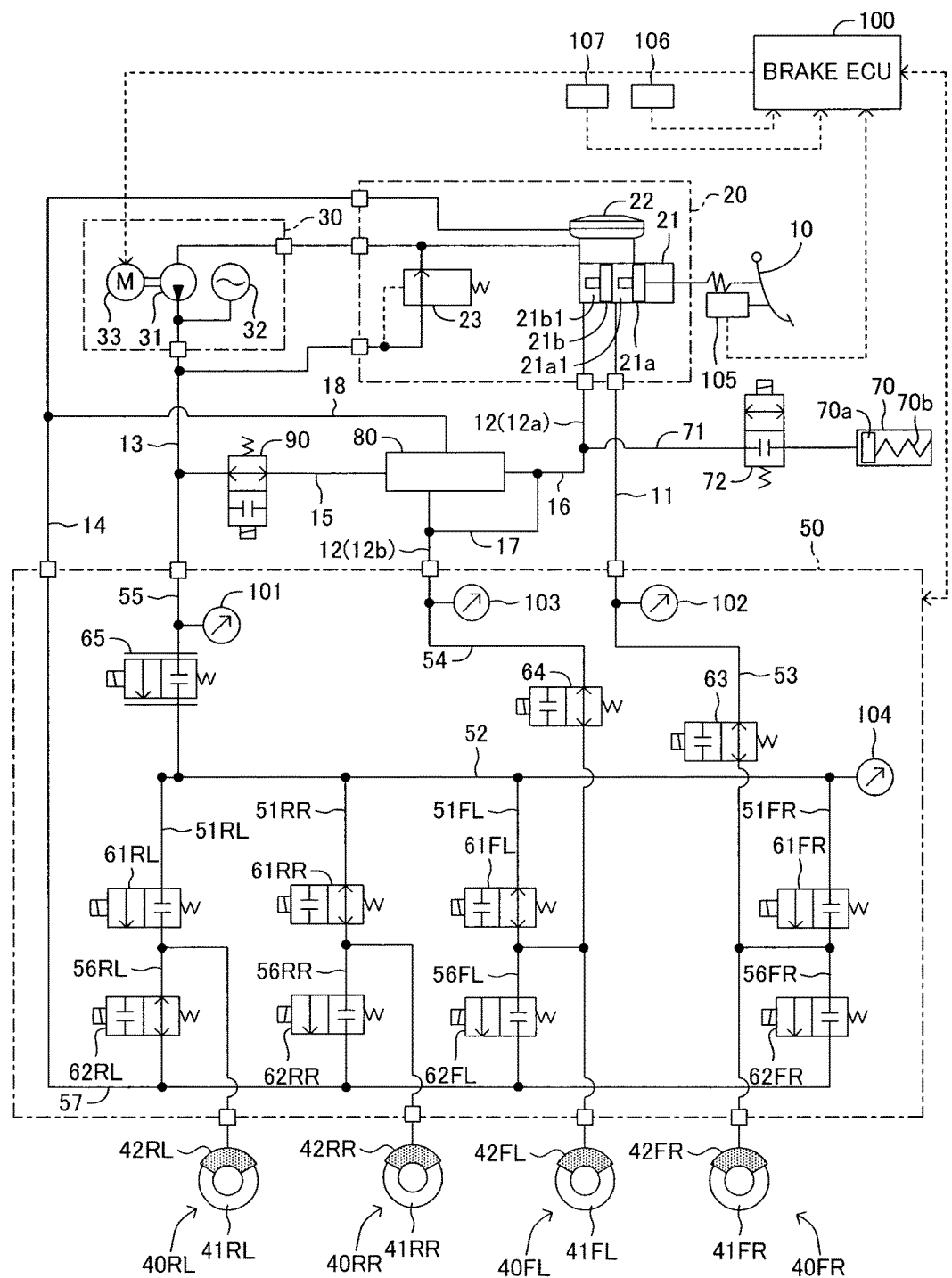
FIG. 1 is a schematic system diagram of a brake device for a vehicle according to an embodiment of the present invention.

Now, a brake device for a vehicle according to an embodiment of the present invention is described referring to the drawings. FIG. 1 is a schematic system diagram of the brake device for a vehicle according to this embodiment.

The brake device for a vehicle includes a brake pedal 10, a master cylinder unit 20, a power hydraulic pressure generation device 30, a hydraulic pressure control valve device 50, a pressure increasing mechanism 80, a pressure increasing mechanism cut valve 90, and a brake ECU 100 for brake control. Brake units 40FR, 40FL, 40RR, and 40RL installed on respective wheels include brake rotors 41FR, 41FL, 41RR, and 41RL, and wheel cylinders 42FR, 42FL, 42RR, and 42RL integrated into brake calipers. In the following description, configurations provided for the respective wheels are denoted by suffixes FR for a front right wheel, FL for a front left wheel, RR for a rear right wheel, and RL for a rear left wheel, but if the specification of the wheel position is not particularly necessary, the suffix is omitted. The brake units 40 are not limited to the case where disk brakes are installed on all the four wheels, and, for example, drum brakes may be installed on all the four wheels, or the disk brakes and the drum brakes may be arbitrarily combined in such a way that the disk brakes are installed on the front wheels and the drum brakes are installed on the rear wheels.

The wheel cylinders 42FR, 42FL, 42RR, and 42RL are connected to the hydraulic pressure control valve device 50, and receive transmitted hydraulic pressures of a working fluid (brake fluid) supplied from the hydraulic pressure control device 50. Then, brake pads are pressed against the brake rotors 41 FR, 41 FL, 41 RR, and 41 RL rotating along with the wheels by the hydraulic pressure transmitted (supplied) from the hydraulic pressure control valve device 50, thereby applying braking forces to the wheels.

The master cylinder unit 20 includes a master cylinder 21 and a reservoir 22. The master cylinder 21 is of a tandem type including pressure pistons 21a and 21b, and generates master cylinder pressures Pmc_FR and Pmc_FL having respective predetermined boost ratios to a pedal depressing force input in response to an operation of depressing the brake pedal 10 by a driver. The reservoir 22 for storing the working fluid is provided at a top of the master cylinder 21. As a result, when the driver's operation of depressing the brake pedal 10 is released and the pressure pistons 21a and 21b are retreated, in the master cylinder 21, pressure chambers 21a1 and 21b1 formed by the pressure pistons 21a and 21b communicate to the reservoir 22. It should be noted that the pressure chambers 21a1 and 21b1 respectively communicate to the hydraulic pressure control valve device 50 via master pressure pipes 11 and 12 described later.

The power hydraulic pressure generation device 30 is a power hydraulic pressure source (power supply), and includes a pressure pump 31 and an accumulator 32. The pressure pump 31 has an inlet opening connected to the reservoir 22 and an outlet opening connected to the accumulator 32, and pressurizes the working fluid through drive of a motor 33. The accumulator 32 converts pressure energy of the working fluid pressurized by the pressure pump 31 into pressure energy of a filler gas such as nitrogen, thereby accumulating the pressure energy. Moreover, the accumulator 32 is connected to a relief valve 23 provided to the master cylinder unit 20. The relief valve 23 opens when the pressure of the working fluid increases to a predetermined pressure or more, thereby returning the working fluid to the reservoir 22.

In this way, the brake device for a vehicle includes, as the hydraulic pressure source for applying a hydraulic pressure of the working fluid to the wheel cylinders 42, the master cylinder 21 for applying the hydraulic pressure by using the pedal depressing force input by the driver via the brake pedal 10, and the power hydraulic pressure generation device 30 for applying the hydraulic pressure independently of the master cylinder 21. Then, in the brake device for a vehicle, the master cylinder 21 (more specifically, pressure chambers 21a1 and 21b1) and the power hydraulic pressure generation device 30 are connected respectively to the hydraulic pressure control valve device 50 via the master pressure pipes 11 and 12 and an accumulator pressure pipe 13. Moreover, the reservoir 22 is connected to the hydraulic pressure control valve device 50 via a reservoir pipe 14. It should be noted that, hereinafter, regarding the master pressure pipe 12, an upstream side (input side) with respect to the pressure increasing mechanism 80 is referred to as master pressure pipe 12a, and a downstream side (output side) with respect to the pressure increasing mechanism 80 is referred to as master pressure pipe 12b for discrimination.

On this occasion, a stroke simulator 70 is connected to the master pressure pipe 12a via a simulator flow passage 71 and a simulator cut valve 72, which is a normally-closed electromagnetic on-off valve. The stroke simulator 70 includes a piston 70a and a spring 70b, and introduces the working fluid having an amount corresponding to a brake operation amount of the brake pedal 10 by the driver into an inside when the simulator cut valve 72 is in the open state. Then, the stroke simulator 70 displaces the piston 70a against a biasing force of the spring 70b in synchronous with the introduction of the working fluid into the inside, thereby enabling a stroke operation of the brake pedal 10 by the driver, and generating a reaction force corresponding to the brake operation amount to provide satisfactory brake operation feeling to the driver. It should be understood that the stroke simulator 70 can be connected to the master pressure pipe 11.

The hydraulic pressure control valve device 50 having a valve mechanism includes four individual flow passages 51 FR, 51 FL, 51 RR, and 51 RL connected to the respective wheel cylinders 42FR, 42FL, 42RR, and 42RL, a main flow passage 52 for communicating the individual flow passages 51FR, 51FL, 51RR, and 51RL to each other, master pressure flow passages 53 and 54 for connecting the individual flow passages 51 FR and 51FL and the master pressure pipes 11 and 12 (12b), respectively, to each other, and an accumulator pressure flow passage 55 for connecting the main flow passage 52 and the accumulator pressure pipe 13 to each other. In this case, the master pressure flow passages 53 and 54 and the accumulator pressure flow passage 55 are connected in parallel with one another to the main flow passage 52.

Holding valves 61FR, 61FL, 61RR, and 61RL, which construct the valve mechanism, are respectively provided on the individual flow passages 51FR, 51FL, 51RR, and 51RL. The holding valves 61FL and 61RR provided for the brake unit 40FL on the front left wheel side and the brake unit 40RR on the rear right wheel side are normally-open electromagnetic on-off valves, each of which maintains an open state by a biasing force of a spring in a non-current supply state of a solenoid, and is brought into the closed state only during a current supply to the solenoid. On the other hand, the holding valves 61FR and 61RL provided for the brake unit 40FR on the front right wheel side and the brake unit 40RL on the rear left wheel side are normally-closed electromagnetic on-off valves, each of which maintains a closed state by a biasing force of a spring in a non-current supply state of a solenoid, and is brought into an open state only during a current supply to the solenoid. In other words, each of the holding valves 61 permits a communication of the working fluid between the main flow passage 52 and the each wheel cylinder 42 in the open state, and inhibits the communication of the working fluid between the main flow passage 52 and the each wheel cylinder 42 in the closed state.

As a result, among the holding values 61FR and 61FL respectively provided on the brake units 40FR and 40FL on the front right and left wheel sides and the holding valves 61RR and 61RL respectively provided on the brake units 40RR and 40RL on the rear right and left wheel sides, the holding valves on the front right and left wheel sides are the normally-open electromagnetic on-off valves, and the holding valves on the rear right and left wheel sides are the normally-closed electromagnetic on-off valves. In other words, the holding valves 61FL and 61RR provided for the brake units 40FL and 40RR corresponding to the two wheels at one of front/rear diagonal positions are configured to be normally-open electromagnetic on-off valves, and the holding valves 61FR and 61RL provided for the brake units 40FR and 40RL corresponding to the two wheels at the other of the front/rear diagonal positions are configured to be normally-closed electromagnetic on-off valves. Thus, the brake device for a vehicle according to this embodiment forms a so-called cross system.

Moreover, pressure reducing individual flow passages 56FR, 56FL, 56RR, and 56RL are respectively connected to the individual flow passages 51FR, 51FL, 51RR, and 51RL. The respective pressure reducing individual flow passages 56 are connected to a reservoir flow passage 57. The reservoir flow passage 57 is connected to the reservoir 22 via the reservoir pipe 14. Pressure reducing valves 62FR, 62FL, 62RR, and 62RL are respectively provided at intermediate portions of the pressure reducing individual flow passages 56FR, 56FL, 56RR, and 56RL. The respective pressure reducing valves 62FR, 62FL, and 62RR are normally-closed electromagnetic on-off valves each being configured to be maintained in a closed state by a biasing force of a spring in a non-current supply state of a solenoid and be brought into an open state only in a current supply state of the solenoid. The pressure reducing valve 62RL is a normally-open electromagnetic on-off valve configured to be maintained in an open state by a biasing force of a spring in a non-current supply state of a solenoid and be brought into a closed state only in a current supply state of the solenoid.

As a result, in the open state, the each pressure reducing valve 62 controls the working fluid to flow from the wheel cylinder 42 via the pressure reducing individual flow passage 56 to the reservoir flow passage 57, thereby reducing a wheel cylinder pressure (corresponding to a control pressure Px described later). Moreover, in the closed state, along with the corresponding holding valve 61 controlled to be in the open state, the each pressure reducing valve 62 controls the working fluid from the main flow passage 52 to flow to the reservoir flow passage 57 via the pressure increasing individual flow passage 56, thereby also reducing a hydraulic pressure (corresponding to the control pressure Px described later) in the main flow passage 52.

Master cut valves 63 and 64 are respectively provided at intermediate portions of the master pressure flow passages 53 and 54. The respective master cut valves 63 and 64 are normally-open electromagnetic on-off valves each being configured to be maintained in an open state by a biasing force of a spring in a non-current supply state of a solenoid, and be brought into a closed state only in a current supply state of the solenoid. By providing the master cut valves 63 and 64 as described above, when the master cut valves 63 and 64 are in the closed state, the connection (communication) is shut off between the master cylinder 21 (and the pressure increasing mechanism 80) and the wheel cylinders 42FR and 42FL, thereby inhibiting the communication of the working fluid, and when the master cut valves 63 and 64 are in the open state, the master cylinder 21 (and the pressure increasing mechanism 80) and the wheel cylinders 42FR and 42FL are connected, thereby permitting the communication of the working fluid.

A pressure increasing linear control valve 65 as a pressure increasing valve is provided at an intermediate portion of the accumulator pressure flow passage 55. The pressure increasing linear control valve 65 is a normally-closed electromagnetic linear control valve configured to be maintained in a closed state by a biasing force of a spring in a non-current supply state of a solenoid, and increases a valve opening degree along with an increase in current supply amount (current value) to the solenoid. A detailed description is not given of the pressure increasing linear control valve 65, but the pressure increasing linear control valve 65 maintains the closed state by a valve closing force represented by a difference between a spring force of biasing a valve body toward a valve closing direction by the built-in spring and a pressure difference force of biasing the valve body toward a valve opening direction by a pressure difference between a primary side (inlet side) through which the working fluid relatively high in pressure communicates and a secondary side (outlet side) through which the working fluid relatively low in pressure communicates.

On the other hand, the pressure increasing linear control valve 65 opens at an opening degree corresponding to a balance between the forces acting on the valve body if an electromagnetic attraction force generated by the current supply to the solenoid and acting toward the direction to open the valve body exceeds the valve closing force, that is, if a relationship of "electromagnetic attraction force>valve closing force (=spring force-pressure difference force)" holds true. Thus, by controlling the current supply amount (current value) to the solenoid, the pressure increasing linear control valve 65 can adjust the opening degree corresponding to the pressure difference force, namely, the pressure difference between the primary side (inlet side) and the secondary side (outlet side).

On this occasion, in the brake device for a vehicle according to this embodiment, for the main flow passage 52 to which the individual flow passages 56 are connected to supply the common hydraulic pressure (control pressure Px described later) to the respective wheel cylinders 42, as a linear control valve, only a pressure increasing linear control valve 65 for increasing the hydraulic pressure (control pressure Px) in the main flow passage 52 is provided. In other words, the brake device for a vehicle is a brake device for a vehicle which employs a system without a pressure reducing linear control valve for using linear control to decrease the hydraulic pressure (control pressure Px) in the main flow passage 52.

Moreover, a pressure increasing mechanism 80 for increasing (providing the servo function for) the master cylinder pressure Pmc_FL output from the pressure chamber 21b1 of the master cylinder 21 and supplying the master cylinder pressure Pmc_FL increased in pressure to the wheel cylinder 42FL is provided for the brake device for a vehicle according to this embodiment. A description is now given of the pressure increasing mechanism 80. Any structure capable of increasing (providing the servo function for) the master cylinder pressure Pmc_FL by means of a mechanical operation described later can be employed as the pressure increasing mechanism 80. Moreover, a description is now given of a case where the pressure increasing mechanism 80 is provided on the master pressure pipe 12, but it should be understood that such a configuration that the pressure increasing mechanism 80 is provided on the master pressure pipe 11 can be embodied.

Figure 2:
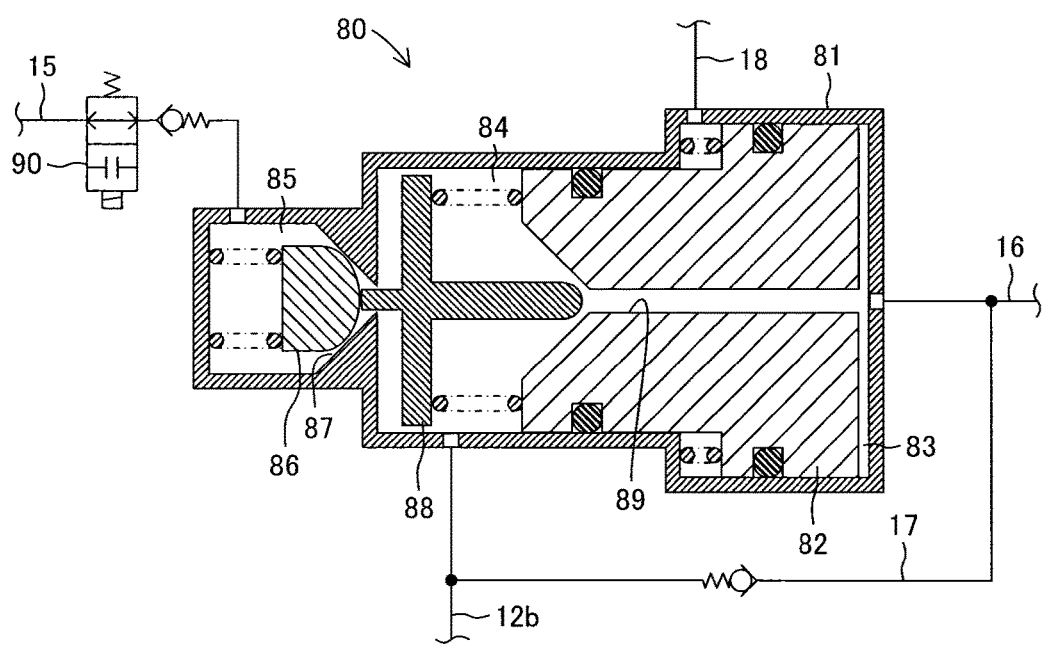
FIG. 2 is a schematic cross sectional view illustrating a configuration of a pressure increasing mechanism of FIG. 1.

As illustrated in FIG. 2, the pressure increasing mechanism 80 includes a housing 81, and a stepped piston 82 fitted into the housing 81 in a liquid-tight and slidable manner. A large diameter chamber 83 is provided on a large diameter side of the stepped piston 82, and a small diameter chamber 84 is provided on a smaller diameter side thereof. The small diameter chamber 84 can communicate to a high pressure chamber 85 connected to the accumulator 32 of the power hydraulic pressure generation device 30 via a high pressure supply valve 86 and a valve seat 87. As illustrated in FIG. 2, the high pressure supply valve 86 is pressed against the valve seat 87 by a biasing force of a spring in the high pressure chamber 85, and is a normally-closed valve.

Moreover, a valve opening member 88 is provided in the small diameter chamber 84 so as to be opposed to the high pressure supply valve 86, and a spring is provided between the valve opening member 88 and the stepped piston 82. A biasing force of the spring acts toward a direction of separating the valve opening member 88 from the stepped piston 82. Moreover, as illustrated in FIG. 2, a return spring is provided between a step portion of the stepped piston 82 and the housing 81, thereby biasing the stepped piston 82 toward a backward moving direction. Note that, a stopper (not shown) is provided between the stepped piston 82 and the housing 81, thereby regulating a forward movement end position of the stepped piston 82.

Further, a communication passage 89 for communicating the large diameter chamber 83 and the small diameter chamber 84 to each other is formed in the stepped piston 82. As illustrated in FIG. 2, the communication passage 89 causes the large diameter chamber 83 and the small diameter chamber 84 to communicate to each other under a state in which the stepped piston 82 is separated from the valve opening member 88 at at least a backward movement end position of the stepped piston 82, and, when the stepped piston 82 moves forward to abut against the valve opening member 88, the communication passage 89 is shut off. The pressure increasing mechanism 80 configured in this way operates as a mechanical pressure increasing device (mechanical valve).

Note that, as illustrated in FIGS. 1 and 2, the high pressure chamber 85 and the power hydraulic pressure generation device 30 are connected to each other via a high pressure supply passage 15, and a check valve for permitting flow of the working fluid from the power hydraulic pressure generation device 30 to the high pressure chamber 85 and preventing flow in an opposite direction is provided in addition to the pressure increasing mechanism cut valve 90 on the high pressure supply flow passage 15. The pressure increasing mechanism cut valve 90 is a normally-open electromagnetic on-off valve configured to be maintained in an open state by a biasing force of a spring in a non-current supply state of a solenoid and be brought into a closed state only in a current supply state of the solenoid.

The pressure increasing mechanism cut valve 90 provided in this way shuts off the transmission of the hydraulic pressure, specifically, the communication of the working fluid, between the power hydraulic pressure generation device 30 (more specifically, the pressure pump 31 and the accumulator 32) and the high pressure chamber 85 in the closed state caused by the current supply to the solenoid. Thus, even if a fluid leak occurs in the pressure increasing mechanism 80 by an abnormality in sealing performance or the like, the pressure increasing mechanism cut valve 90 maintained in the closed state can securely prevent the working fluid at a high pressure from flowing backward from the accumulator 32 via the pressure increasing mechanism 80 and the master pressure pipe 12a to the master cylinder 21. Moreover, the communication (connection) between the accumulator 32 and the high pressure chamber 85 of the pressure increasing mechanism 80 via the high pressure supply passage 15 is shut off, and, thus, even if a fluid leak occurs in the pressure increasing mechanism 80 by an abnormality in sealing performance or the like, the hydraulic pressure (corresponding to an accumulator pressure Pacc described later) can be securely prevented from reducing (being consumed) in the accumulator 32.

Moreover, the check valve provided in the high pressure supply passage 15 permits the flow of the working fluid from the power hydraulic pressure generation device 30 to the high pressure chamber 85 when the hydraulic pressure in the power hydraulic pressure generation device 30 (more specifically, the accumulator 32) is higher than the hydraulic pressure in the high pressure chamber 85, but prevents the flows in both directions under the closed state when the hydraulic pressure in the power hydraulic pressure generation device 30 is equal to or less than the hydraulic pressure in the high pressure chamber 85. Thus, when the pressure increasing mechanism cut valve 90 is in the open state, even if a fluid leak occurs in the power hydraulic pressure generation device 30, the working fluid is prevented from flowing backward from the high pressure chamber 85 to the power hydraulic pressure generation device 30, and the hydraulic pressure in the small diameter chamber 84 is prevented from reducing.

Moreover, the master pressure pipe 12a and the large diameter chamber 83 of the pressure increasing mechanism 80 are connected to each other via a pilot passage 16, and a bypass passage 17 for connection while bypassing the pressure increasing mechanism 80 is provided between the pilot passage 16 and an output side (namely, the master pressure pipe 12b communicating to the small diameter chamber 84) of the pressure increasing mechanism 80. Then, a check valve for permitting the working fluid to flow from the pilot passage 16 (master pressure pipe 12a) to the master pressure pipe 12b, which is an output side of the pressure increasing mechanism 80, and preventing the working fluid from flowing in the opposite direction is provided in the bypass passage 17. Further, a reservoir passage 18 is provided between a space formed by a step portion of the stepped piston 82 and the housing 81, and the reservoir pipe 14 communicating to the reservoir 22.

A brief specific description is given of the operation of the pressure increasing mechanism 80. In the pressure increasing mechanism 80, when the working fluid (master cylinder pressure Pmc_FL) is supplied from the master cylinder 21 via the master pressure pipe 12a and the pilot passage 16 to the large diameter chamber 83, the working fluid is supplied to the small diameter chamber 82 via the communication passage 89. Then, when the force in the forward moving direction acting on the stepped piston 82 by the supply of the working fluid (master cylinder pressure Pmc_FL) (forward moving force caused by the master cylinder pressure Pmc_FL acting on the large diameter chamber 83) becomes larger than the biasing force of the return spring, the stepped piston 82 moves forward. When the stepped piston 82 thus abuts against the valve opening member 88, and the communication passage 89 is shut off, the hydraulic pressure in the small diameter chamber 84 increases along with the forward movement of the stepped piston 82, and the working fluid increased in pressure (namely, the servo pressure) is output via the master pressure pipe 12b to the master pressure flow passage 54 of the hydraulic pressure control valve device 50.

Moreover, when the high pressure supply valve 86 is switched to the open state by the front wheel of the valve opening member 88, the high pressure working fluid is supplied from the high pressure chamber 85 to the small diameter chamber 84, resulting in a further increase in hydraulic pressure of the small diameter chamber 84. In this case, when the pressure increasing mechanism cut valve 90 is in the closed state and the hydraulic pressure (accumulator pressure Pacc) of the working fluid accumulated in the accumulator 32 of the power hydraulic pressure generation device 30 is higher than the hydraulic pressure in the high pressure chamber 85, the hydraulic pressure (accumulator pressure Pacc) in the accumulator 32 is supplied to the high pressure chamber 85 via the check valve on the high pressure supply passage 15, and is then supplied to the small diameter chamber 84. Then, in the stepped piston 82, the hydraulic pressure in the large diameter chamber 83, namely, the master cylinder pressure Pmc_FL is adjusted to such a magnitude that the force acting on the large diameter side (master cylinder pressure Pmc_FL×pressure receiving area) and the force acting on the small diameter side (servo pressure×pressure receiving area) are balanced each other, and the adjusted hydraulic pressure is output. Thus, the pressure increasing mechanism 80 can be considered as a mechanical booster mechanism.

On the other hand, when the pressure increasing mechanism cut valve 90 is in the open state and the hydraulic pressure (accumulator pressure Pacc) in the accumulator 32 is equal to or less than the hydraulic pressure in the high pressure chamber 85, the check valve provided on the high pressure supply passage 15 prevents the flow of the working fluid between the accumulator 32 and the high pressure chamber 85, and hence the stepped piston 82 cannot move forward any more. Moreover, the stepped piston 82 may abut against the stopper to be restrained from moving forward. When the master cylinder pressure Pmc_FL provided from the master cylinder 21 increases to be higher than the hydraulic pressure in the small diameter chamber 84 in this state, the master cylinder pressure Pmc_FL is supplied to the master pressure pipe 12b via the bypass passage 17 and the check valve.

The power hydraulic pressure generation device 30 and the hydraulic pressure control valve device 50 are controlled to be driven by the brake ECU 100 serving as control means. The brake ECU 100 includes a microcomputer constructed by a CPU, a ROM, a RAM, and the like as a main component, and includes a pump drive circuit, an electromagnetic valve drive circuit, an interface for inputting various sensor signals, and a communication interface. All the respective electromagnetic on-off valves 61 to 64, 72, and 90 and the pressure increasing linear control valve 65 provided in the hydraulic pressure control valve device 50 are connected to the brake ECU 100, and the open/closed state and the opening degrees (for the pressure increasing linear control valve 65) are controlled by solenoid drive signals output from the brake ECU 100. Moreover, the motor 33 provided to the power hydraulic pressure generation device 30 is also connected to the brake ECU 100, and is controlled to be driven by a motor drive signal output from the brake ECU 100.

The hydraulic pressure control valve device 50 is provided with an accumulator pressure sensor 101, master cylinder pressure sensors 102 and 103, and a control pressure sensor 104 as hydraulic pressure detection means. The accumulator pressure sensor 101 detects a hydraulic pressure of the working fluid in the accumulator pressure flow passage 55 on the power hydraulic pressure generation device 30 side (upstream side) with respect to the pressure increasing linear control valve 65, namely, the accumulator pressure Pacc because the accumulator pressure flow passage 55 communicates to the accumulator 32 via the accumulator pressure pipe 13. The accumulator pressure sensor 101 outputs a signal representing the detected accumulator pressure Pacc to the brake ECU 100. With this, the brake ECU 100 reads the accumulator pressure Pacc at a predetermined cycle, and, if the accumulator pressure Pacc is less than a predetermined lowest set pressure, the brake ECU 100 drives the motor 33 to pressurize the working fluid by the pressure pump 31, thereby controlling the accumulator pressure Pacc to be always maintained within a set pressure range.

The master cylinder pressure sensor 102 detects a hydraulic pressure of the working fluid in the master pressure flow passage 53 on the master cylinder 21 side (upstream side)

with respect to the master cut valve 63, namely, the master cylinder pressure Pmc_FR because the master pressure flow passage 53 communicates to the pressure chamber 22a1 via the master pressure pipe 11. The master cylinder pressure sensor 103 detects a hydraulic pressure of the working fluid in the master pressure flow passage 54 on the master cylinder 21 side (upstream side) with respect to the master cut valve 64, namely, the master cylinder pressure Pmc_FL because the master pressure flow passage 54 communicates to the pressure chamber 22b1 via the master pressure pipe 12. The master cylinder pressure sensors 102 and 103 output signals representing the detected master cylinder pressures Pmc_FR and Pmc_FL to the brake ECU 100. The control pressure sensor 104 outputs a signal representing the control pressure Px, which is a hydraulic pressure of the working fluid in the main flow passage 52, to the brake ECU 100.

Moreover, a stroke sensor 105 provided on the brake pedal 10 is connected to the brake ECU 100. The stroke sensor 105 outputs, to the brake ECU 100, a signal representing a pedal stroke Sm, which is a depressing amount (operation amount) of the brake pedal 10 by the driver. Moreover, a wheel speed sensor 106 is connected to the brake ECU 100. The wheel speed sensor 106 detects a wheel speed Vx, which is a rotational speed of the front and rear, right and left wheels, and outputs the signal representing the detected wheel speed Vx to the brake ECU 100. Further, an indicator 107 for notifying the driver of an abnormality occurring on the brake device for a vehicle is connected to the brake ECU 100. The indicator 107 follows the control by the brake ECU 100, and notifies the driver of the occurring abnormality.

A description is now given of the brake control carried out by the brake ECU 100. The brake ECU 100 selectively carries out the brake control in two control modes, which are a linear control mode (4S mode) in which the hydraulic pressure (more specifically, the accumulator pressure Pacc) output from the power hydraulic pressure generation device 30 is adjusted (increased) by the pressure increasing linear control valve 65 and the adjusted hydraulic pressure is transmitted to the respective wheel cylinders 42, and a backup mode (2S mode) in which at least the master cylinder pressures Pmc_FR and Pmc_FL generated in the master cylinder 21 in response to the pedal depressing force by the driver on the brake pedal 10 are transmitted to the wheel cylinders 42 (42FR and 42FL).

Figure 3:
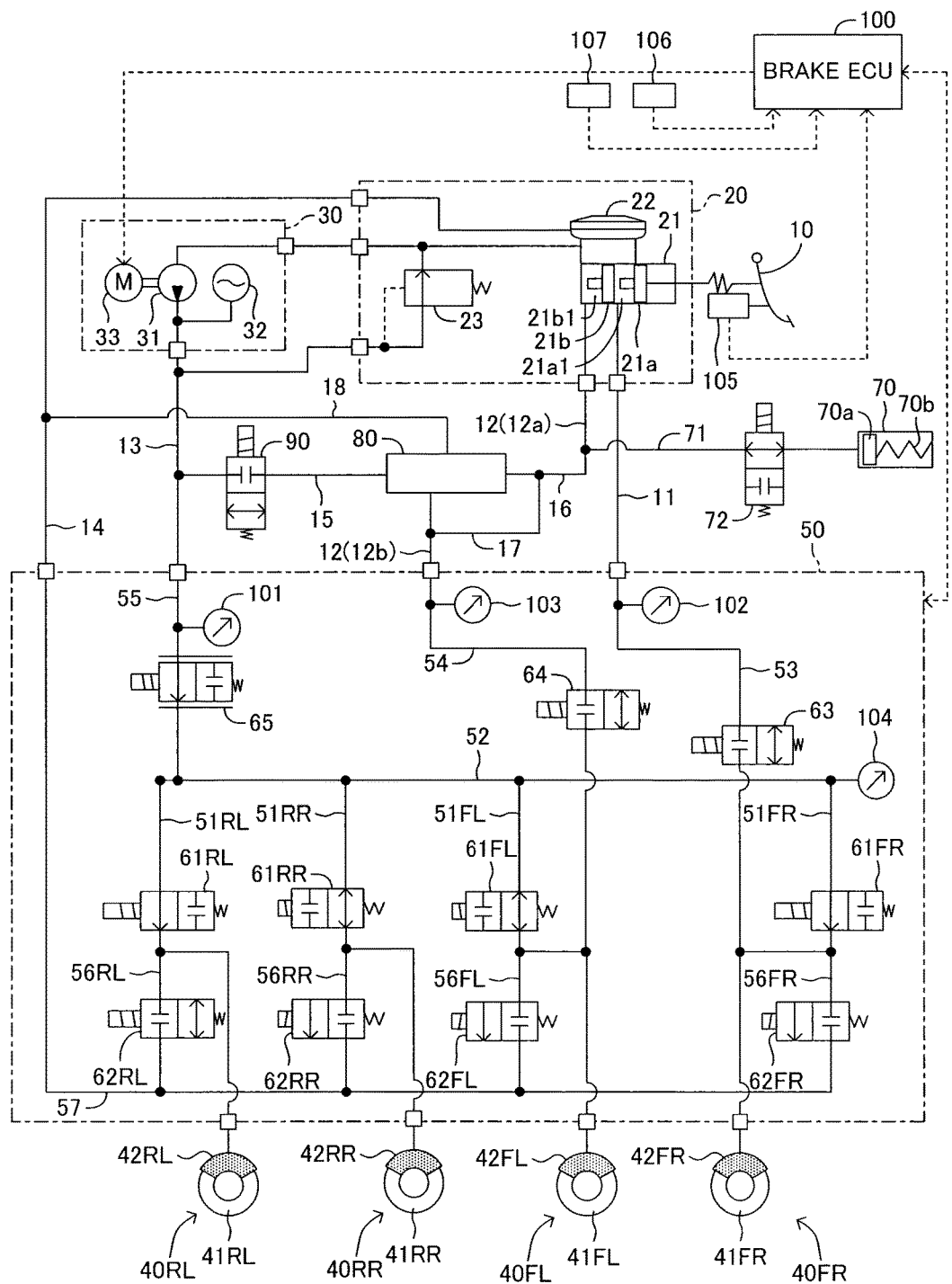
FIG. 3 is a diagram illustrating a linear control mode by the brake device for a vehicle according to the embodiment of the present invention.

First, as illustrated in FIG. 3, in the linear control mode, the brake ECU 100 maintains each of the normally-open master cut valves 63 and 64 in the closed state by the current supply to the solenoids, and maintains the simulator cut valve 72 in the open state by the current supply to the solenoid. It should be noted that, in the linear control mode according to this embodiment, the brake ECU 100 maintains the normally-open pressure increasing mechanism cut valve 90 in the closed state by the current supply to the solenoid. Moreover, in the linear control mode, the brake ECU 100 controls a current supply amount (current value) to the solenoid of the pressure increasing linear control valve 65 so that the pressure increasing linear control valve 65 has an opening degree corresponding to the current supply amount.

Moreover, in the linear control mode, for example, when the driver is carrying out the depressing operation on the brake pedal 10 (hereinafter also simply referred to as "brake operation"), the brake ECU 100 increases the wheel cylinder pressure in each of the wheel cylinders 42 based on changes in master cylinder pressures Pmc_FR and Pmc_FL detected by the master cylinder pressure sensors 102 and 103 and/or a change in the stroke Sm of the brake pedal 10 detected by the stroke sensor 105. In this case, in principle, the brake ECU 100 maintains the normally-open holding valves 61FL and 61RR in the open state, maintains the normally-closed holding valves 61FR and 61RL in the open state by the current supply to the solenoids, maintains the normally-closed pressure reduction valves 62FR, 62FL, and 62RR in the closed state, and maintains the normally-open pressure reducing valve 62RL in the closed state by the current supply to the solenoid.

On the other hand, in the linear control mode, for example, when the brake pedal 10 is operated from the depressing operation (brake operation) by the driver toward the return direction, the brake ECU 100 decreases the wheel cylinder pressure in each of the wheel cylinders 42 based on changes in master cylinder pressures Pmc_FR and Pmc_FL detected by the master cylinder pressure sensors 102 and 103 and/or a change in stroke Sm of the brake pedal 10 detected by the stroke sensor 105. In this case, in principle, the brake ECU 100 maintains the normally-closed pressure increasing linear control valve 65 in the closed state, maintains the normally-closed holding valves 61FR and 61RL in the open state by the current supply to the solenoids, maintains the normally-open holding valves 61FL and 61RR in the open state, maintains the normally-closed pressure reducing valves 62FR, 62FL, and 62RR in the open state by the current supply to the solenoids, and maintains the normally-open pressure reducing valve 62RL in the open state by the current supply to the solenoid.

Further, in the linear control mode, for example, when the antiskid control of suppressing an excessive slip in the longitudinal direction of the wheel to which the braking force is applied needs to be executed based on the wheel speeds Vx detected by the wheel speed sensor 106, the brake ECU 100 maintains the wheel cylinder pressures in the respective wheel cylinders 42 in addition to the pressure increase and the pressure decrease described before. In the case of the maintenance of the pressures, in principle, the brake ECU 100 maintains the normally-closed holding valves 61FR and 61RL in the closed state, maintains the normally-open holding valves 61FL and 61RR in the closed state by the current supply to the solenoids, maintains the normally-closed pressure reducing valves 62FR, 62FL, and 62RR in the closed state, and maintains the normally-open pressure reducing valve 62RL in the closed state by the current supply to the solenoid.

The open state and the closed state of each of the valves constructing the hydraulic pressure control valve device 50 are controlled in this way. Thus, both the master cut valves 63 and 64 are maintained in the closed state in the linear control mode, and hence the master cylinder pressures Pmc_FR and Pmc_ FL output from the master cylinder 21 are not transmitted to the wheel cylinders 42FR and 42FL. Moreover, the pressure increasing mechanism cut valve 90 is maintained in the closed state, and hence the accumulator pressure Pacc output from the pressure pump 31 or the accumulator 32 of the power hydraulic pressure generation device 30 is not transmitted to the pressure increasing mechanism 80. Thus, in the linear control mode, the high accumulator pressure Pacc is prevented from being transmitted to the master cylinder 21 from the high pressure chamber 85 of the pressure increasing mechanism 80 via the small diameter chamber 84, the communication passage 89, the large diameter chamber 83, the pilot passage 16, and the master pressure pipe 12 (12a).

On the other hand, the pressure increasing linear control valve 65 is in the current supply control state of the solenoid, and hence the accumulator pressure Pacc output from the power hydraulic pressure generation device 30 is adjusted (increased) by the pressure increasing linear control valve 65, and is transmitted to the wheel cylinders 42 at the four wheels via the main flow passage 52. In this case, when the driver is carrying out a braking operation on the brake pedal 10, the holding valves 61 are maintained in the open state and the pressure reducing valves 62 are maintained in the closed state, and hence the wheel cylinder pressures in the respective wheel cylinders 42 are increased. Moreover, when the driver is operating the brake pedal 10 toward the return direction, the holding valves 61 are maintained in the open state and the pressure reducing valves 62 are maintained in the open state, and hence the wheel cylinder pressures in the respective wheel cylinders 42 and the control pressure Px in the main flow passage 52 are decreased. Further, when the driver is carrying out a holding operation on the brake pedal 10, or based on the antiskid control, the holding valves 61 are maintained in the closed state and the pressure reducing valves 62 are also maintained in the closed state, and hence the wheel cylinder pressures in the respective wheel cylinders 42 are maintained.

Incidentally, the vehicle on which the brake device for a vehicle according to this embodiment is installed may be, for example, an electric vehicle (EV) including a running motor driven by battery power supply, a hybrid vehicle (HV) including an internal combustion engine in addition to the running motor, and a plug-in hybrid vehicle (PHV), which is a hybrid vehicle (HV) further including a battery rechargeable by using an external power supply. Each of those vehicles can carry out regenerative braking in the following manner. Electric power is generated by converting rotational energy of the wheels into electric energy by the running motor, and the drive battery is charged by using the generated electric power, thereby acquiring a braking force. If the regenerative braking is carried out, a braking force is generated by the brake device for a vehicle, which is acquired by subtracting a regenerative braking force amount from a total braking force required for braking the vehicle, thereby carrying out brake regeneration cooperative control by using both the regenerative braking and the hydraulic braking.

Specifically, the brake ECU 100 receives a braking request, and then starts the brake regeneration cooperative control. The braking request is generated when the braking force needs to be applied to the vehicle, for example, when the driver carries out the brake operation on the brake pedal 10, or when automatic braking needs to be operated. In this case, the automatic braking may be operated in traction control, vehicle stability control, headway distance control, collision prevention control, and the like, and if control start conditions for those kinds of control are satisfied, the braking request is generated.

When the brake ECU 100 receives the braking request, the brake ECU 100 acquires, as the brake operation amount, at least one of the master cylinder pressure Pmc_FR detected by the master cylinder pressure sensor 102, the master cylinder pressure Pmc_FL detected by the master cylinder pressure sensor 103, and the stroke Sm detected by the stroke sensor 105, and calculates a target braking force that increases along with an increase in the master cylinder pressure Pmc_FR, the master cylinder pressure Pmc_FL, and/or the stroke Sm. Regarding the brake operation amount, the present invention may also be carried out so that the target braking force is calculated based on, for example, a pedal depressing force acquired by providing a depressing force sensor for detecting the pedal depressing force on the brake pedal 10 in place of the acquisition of the master cylinder pressure Pmc_FR, the master cylinder pressure Pmc_FL, and/or the stroke Sm.

The brake ECU 100 transmits information representing the calculated target braking force to a hybrid ECU (not shown). The hybrid ECU calculates the braking force generated by the power regeneration of the target braking force, and transmits information representing the regenerative braking force, which is a calculation result, to the brake ECU 100. As a result, the brake ECU 100 calculates the target hydraulic pressure braking force, which is a braking force to be generated on the brake device for a vehicle, by subtracting the regenerative braking force from the target braking force. In this case, the regenerative braking force generated by the power regeneration carried out by the hybrid ECU is changed not only by the rotational speed of the running motor but also by the regenerative power control depending on a charged state (state of charge: SOC) of the battery. Thus, an appropriate target hydraulic pressure braking force can be calculated by subtracting the regenerative braking force from the target braking force.

Then, the brake ECU 100 calculates, based on the calculated target hydraulic pressure braking force, a target hydraulic pressure for each of the wheel cylinders 42 corresponding to the target hydraulic pressure braking force, and controls driving currents for the pressure increasing linear control valves 65, the holding valves 61, and the pressure reducing valves 62 so that the wheel cylinder pressures become equal to the target hydraulic pressures. In other words, the brake ECU 100 controls the current supply amounts (current values) for the solenoids of the pressure increasing linear control valve 65 and controls the current supply to the solenoids of the holding valves 61 and the pressure reducing valves 62 so that the control pressure Px (=wheel cylinder pressure) detected by the control pressure sensor 104 follows the target hydraulic pressure.

With this control, the working fluid is supplied from the power hydraulic pressure generation device 30 to the respective wheel cylinders 42 via the pressure increasing linear control valve 65, the main flow passage 52, and the holding valves 61 in the open state, resulting in an increase of the control pressure Px (=wheel cylinder pressure) to generate the braking forces on the wheels. Moreover, the working fluid is discharged to the reservoir flow passage 57 from the main flow passage 52 and the wheel cylinders 42 via the pressure reducing valves 62, resulting in a decrease of the control pressure Px (=wheel cylinder pressure) to appropriately adjust the braking forces generated on the respective wheels. Then, for example, when the braking operation by the driver is released, the current supply to the solenoids of all the electromagnetic valves constructing the hydraulic pressure control valve device 50 is shut off, and all the electromagnetic valves are returned to original positions illustrated in FIG. 1.

Note that, the present invention does not always need to carry out brake regeneration cooperative control, and it should be understood that the present invention can be applied to a vehicle on which the regenerative braking force is not generated. In this case, the target hydraulic pressure may directly be calculated based on the brake operation amount. The target hydraulic pressure is set by using a map, a calculation equation, or the like so as to have a larger value as the brake operation amount increases.

A description is now given of an example of the backup mode. In the brake device for a vehicle, the brake ECU 100 is configured to carry out a predetermined initial check, and if, for example, an abnormality such as a switching control failure of the respective electromagnetic on-off valves and an operation abnormality of the brake ECU 100 itself in the control system (electric system), or a possibility of a leak of the working fluid is detected as a result of the initial check, the brake ECU 100 operates the brake device for a vehicle to generate braking forces on the wheels in the backup mode.

First, if an abnormality in the control system (electric system) is detected, the brake ECU 100 shuts off the current supply to all the electromagnetic valves, thereby returning all the electromagnetic valves to original positions illustrated in FIG. 1. As a result, the pressure increasing linear control valve 65 is brought into the closed state by shutting off the current supply to the solenoids, and the power hydraulic pressure generation device 30 is shut off from the respective wheel cylinders 42 via the main flow passage 52. Moreover, the pressure increasing mechanism cut valve 90 is brought into the open state, and the pressure increasing mechanism 80 thus communicates to the accumulator 32. Moreover, the holding valves 61FR and 61RL are brought into the closed state, and the holding valves 61FL and 61RR are brought into the open state. As a result, the wheel cylinder 42FL for the front left wheel and the wheel cylinder RR for the rear right wheel RR communicate to each other via the main flow passage 52, and the wheel cylinder 42FR for the front right wheel and the wheel cylinder 42RL for the rear left wheel are shut off from the main flow passage 52.

When the driver carries out the depressing operation on the brake pedal 10 in this state, the working fluid in the pressure chambers 21$a$1 and 21$b$1 of the master cylinder 21 is pressurized. As a result, the hydraulic pressure in the pressure chamber 21$a$1 (master cylinder pressure Pmc_FR) can be supplied via the master pressure pipe 11, the master pressure flow passage 53, and the master cut valve 63 in the open state to the wheel cylinder 42FR for the front right wheel, thereby appropriately operating the brake unit 40FR.

On the other hand, the hydraulic pressure (master cylinder pressure Pmc_FL) in the pressure chamber 21$b$1 is supplied via the master pressure pipe 12 (12$a$) and the pilot passage 16 to the pressure increasing mechanism 80, and the pressure increasing mechanism 80 starts operating. In other words, in the pressure increasing mechanism 80, the stepped piston 82 moves forward, the communication between the small diameter chamber 84 and the large diameter chamber 83 via the communication passage 89 is shut off by the valve opening member 88, and the hydraulic pressure in the small diameter chamber 84 increases. Moreover, when the valve opening member 88 moves forward, and the high pressure supply valve 86 is brought into the open state, the high-pressure working fluid is supplied from the accumulator 32 to the high pressure chamber 85 via the pressure increasing mechanism cut valve 90 in the open state, and the accumulator pressure Pacc is transmitted to the small diameter chamber 84.

As a result, the hydraulic pressure (servo pressure) in the small diameter chamber 84 becomes higher than the master cylinder pressure Pmc_FL, is supplied to the wheel cylinder 42FL for the front left wheel via the master pressure pipe 12 (12$b$), the master pressure flow passage 54, and the master cut valve 64 in the open state, and is supplied to the wheel cylinder 42RR for the rear right wheel via the holding valve 61FL, the main flow passage 52, and the holding valve 61RR. Thus, the servo pressure higher than the master cylinder pressure Pmc_FL is supplied to the wheel cylinder 42FL for the front left wheel and the wheel cylinder 42RR for the rear right wheel, resulting in appropriate operations of the brake units 40FL and 40RR.

Moreover, the pressure pump 31 of the power hydraulic pressure generation device 30 is in a stop state in this state, and the hydraulic pressure (accumulator pressure Pacc) of the accumulator 32 thus gradually decreases. Therefore, when the accumulator pressure Pacc decreases to be equal to or less than the hydraulic pressure in the high pressure chamber 85, the check valve provided on the high pressure supply passage 15 prevents the working fluid from flowing from the high pressure chamber 85 to the accumulator 32. Thus, the stepped piston 82 is prevented from moving forward, the hydraulic pressure in the small diameter chamber 84 does not increase any more, and the pressure increasing mechanism 80 cannot provide the boost function any more. Then, when the pedal depressing force by the driver on the brake pedal 10 increases the hydraulic pressure (master cylinder pressure Pmc_FL) in the pressure chamber 21$b$1 of the master cylinder 21 to be more than the hydraulic pressure in the small diameter chamber 84, the master cylinder pressure Pmc_FL is supplied to the wheel cylinder 42FL for the front left wheel and the wheel cylinder 42RR for the rear right wheel via the bypass passage 17, the master pressure pipe 12$b$, the master pressure flow passage 54, the master cut valve 64, the holding valve 61FL, the main flow passage 52, and the holding valve 61RR.

On this occasion, the holding valve 61RL is in the closed state, and the hydraulic pressure (servo pressure or the master cylinder pressure Pmc_FL) in the pressure chamber 22$b$1 is thus not supplied to the wheel cylinder 42RL for the rear left wheel via the main flow passage 52. This configuration is employed to prevent occurrence of the following problem. An amount of the working fluid which can be supplied from the one pressure chamber 22$b$1 of the master cylinder 21 is limited, and hence, if the number of the wheel cylinders as supply destinations increases, the hydraulic pressure in the wheel cylinder cannot be sufficiently increased. Therefore, in this embodiment, the servo pressure (or master cylinder pressure Pmc_FL) is supplied to the wheel cylinders 42FL and 42RR for the two wheels (front left wheel and the rear right wheel) at positions diagonal to each other. As a result, the yaw (yaw moment) can be hardly generated, and the two brake units 40FL and 40RR can be appropriately operated. Note that, as described above, the hydraulic pressure (master cylinder pressure Pmc_FR) is supplied from the pressure chamber 21$a$1 of the master cylinder 21 to the wheel cylinder 42FR for the front right wheel via the master cut valve 63 in the open state.

As described above, in this embodiment, the hydraulic pressure (master cylinder pressures Pmc_FR and Pmc_FL) of the master cylinder 21 or the hydraulic pressure (servo pressure) via the pressure increasing mechanism 80 is supplied to the wheel cylinders 42FR, 42FL, and 42RR for the three wheels in an abnormal state of the control system (electric system), and the braking force for the entire vehicle can be increased compared with the case where the hydraulic pressure is supplied to the wheel cylinders for the two wheels. Then, while the pressure increasing mechanism 80 is operating, the servo pressure approximately equal to the master cylinder pressure Pmc_FL and higher than the master cylinder pressure Pmc_FR is supplied to the wheel cylinder 42FL for the front left wheel and the wheel cylinder 42RR for the rear right wheel, and thus the yaw (yaw moment) can be less generated.

Figure 4:
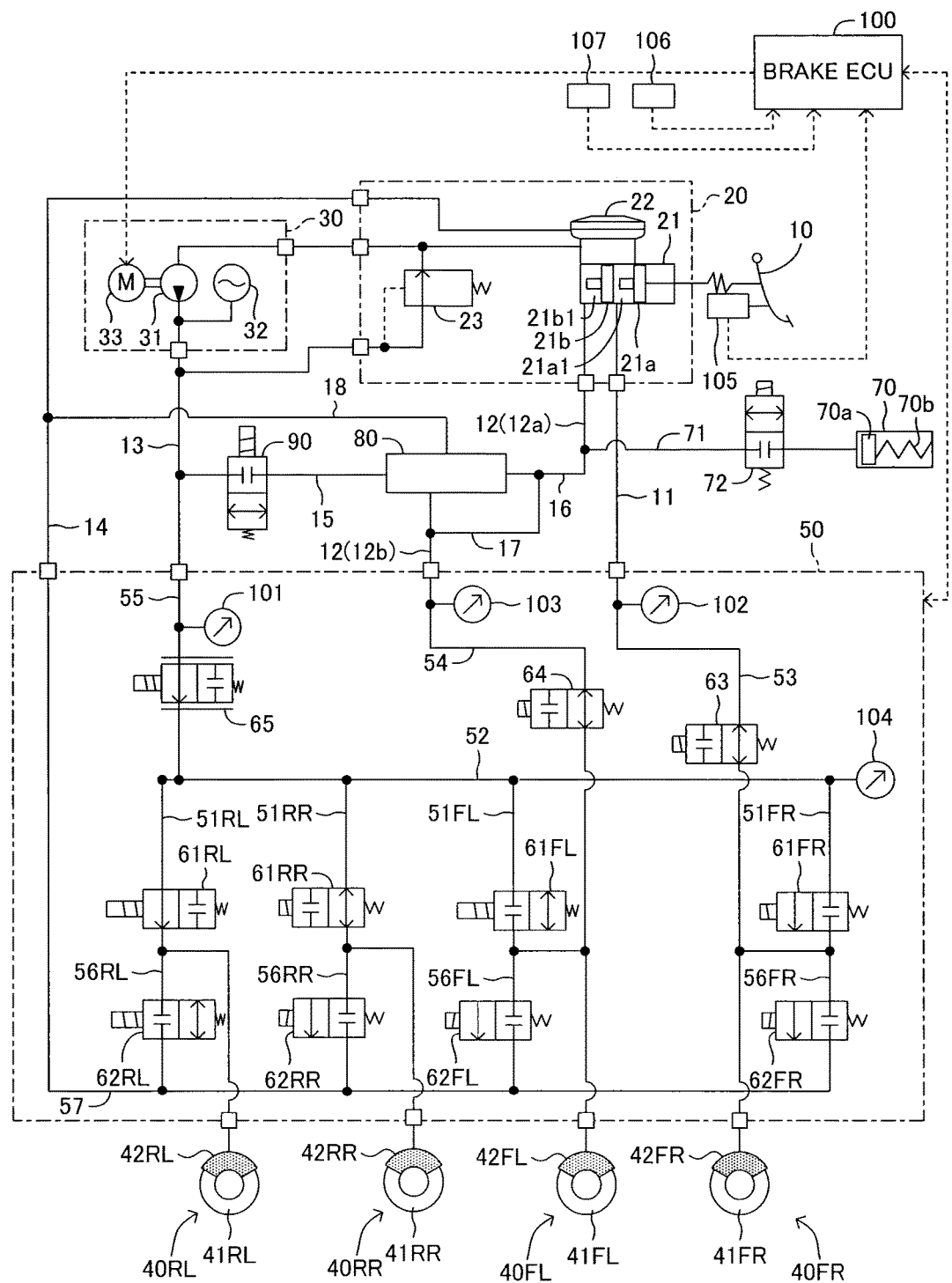
FIG. 4 is a diagram illustrating a backup mode by the brake device for a vehicle according to the embodiment of the present invention when a fluid leak occurs.

A description is now given of the backup mode when a possibility of the fluid leak is detected. When the brake ECU 100 detects a possibility of a fluid leak in the brake device for a vehicle, for example, based on a change (decrease) in the control pressure Px detected by the control pressure sensor 104, as illustrated in FIG. 4, the brake ECU 100 brings the holding valves 61FR and 61FL for the front right and left wheels into the closed state, brings the holding valves 61RR and 61RL for the rear right and left wheels into the open state, and brings the master cut valves 63 and 64 into the open state. Further, the brake ECU 100 brings the simulator cut valve 72 into the closed state, maintains the pressure increasing mechanism cut valve 90 in the closed state, and brings all the pressure reducing valves 62 into the closed state.

As a result, the wheel cylinders 42RR and 42RL for the rear right and left wheels communicate to the pressure pump 31 and/or the accumulator 32 of the power hydraulic pressure generation device 30 via the holding valves 61RR and 61RL, the main flow passage 52, the pressure increasing linear control valve 65, the accumulator pressure flow passage 55, and the accumulator pressure pipe 13. Therefore, the accumulator pressure Pacc is controlled by the pressure increasing linear control valve 65 so that the hydraulic pressure becomes the control pressure Px in the wheel cylinders 42RR and 42RL.

On the other hand, the wheel cylinder 42FR for the front right wheel communicates to the pressure chamber 21a1 of the master cylinder 21 via the master cut valve 63, the master pressure flow passage 53, and the master pressure pipe 11, and the hydraulic pressure thereof becomes the master cylinder pressure Pmc_FR. Moreover, the wheel cylinder 42FL for the front left wheel communicates to the pressure chamber 21b1 of the master cylinder 21 via the master cut valve 64, the master pressure flow passage 54, the master pressure pipe 12b, the pressure increasing mechanism 80, the pilot passage 16, and the master pressure pipe 12a, and the hydraulic pressure thereof becomes the servo pressure higher than the master cylinder pressure Pmc_FL in response to the operation of the pressure increasing mechanism 80.

In this way, when a possibility of the fluid leak in the brake device for a vehicle is detected, the holding valves 61FR and 61FL for the front right and left wheels are brought into the closed state (shutoff state). As a result, the communication between the wheel cylinder 42FR and the wheel cylinder 42FL for the front right and left wheels via the main flow passage 52 is shut off, and the communication between the wheel cylinders 42FR and 42FL for the front right and left wheels and the wheel cylinders 42RR and 42RL for the rear right and left wheels via the main flow passage 52 is shut off. In other words, if the possibility of the fluid leak in the brake device for a vehicle is detected, the wheel cylinders 42 for the front wheels and the rear wheels are shut off from each other, the wheel cylinders 42 for the front left wheel and the front right wheel are shut off from each other on the front wheel side, and thus the three brake systems for the front right wheel, the front left wheel, and the rear right and left wheels are isolated from one another. As a result, even if a fluid leak occurs in one of those three brake systems, the other brake systems are not affected.

A specific description is now given of this configuration assuming a case where a fluid leak occurs from the wheel cylinder 42FL to the outside, or an abnormality occurs in the sealing performance of the pressure reducing valve 62FL in the brake unit 40FL for the front left wheel. In this case, the brake ECU 100 can detect a possibility of the fluid leak occurring in the brake device for a vehicle based on, for example, a decrease in the accumulator pressure Pacc detected by the accumulator pressure sensor 101 or a decrease in the control pressure Px detected by the control pressure sensor 104 in the linear control mode, but the brake ECU 100 cannot identify a location (brake system) at which the fluid leak occurs. However, as described above, the three brake systems for the front right wheel, the front left wheel, and the rear right and left wheels are isolated from one another. In this manner, even if a fluid leak occurs from the wheel cylinder 42FL for the front left wheel to the outside, or an abnormality occurs in the sealing performance of the pressure reducing valve 62FL, the master cylinder pressure Pmc_FR can be supplied to the other wheel, namely, the front right wheel, thereby generating an appropriate braking force. The control pressure Px acquired by controlling (adjusting) the accumulator pressure Pacc can be supplied to the rear right and left wheels, thereby generating appropriate braking forces.

Moreover, when a possibility of a fluid leak in the brake device for a vehicle is detected as described above, the brake ECU 100 maintains the pressure increasing mechanism cut valve 90 in the closed state. As a result, the communication (connection) between the accumulator 32 of the power hydraulic pressure generation device 30 and the high pressure chamber 85 of the pressure increasing mechanism 80 via the high pressure supply passage 15 is shut off, and the transmission of the hydraulic pressure, namely, the communication of the working fluid from the accumulator 32 to the pressure increasing mechanism 80 is inhibited. Thus, even if a fluid leak occurs from the wheel cylinders 42 for the front right and left wheels to the outside or an abnormality occurs in sealing performance of the pressure reducing valve 62FL, the communication of the working fluid from the accumulator 32 via the pressure increasing mechanism 80 does not occur.

As a result, for example, the communication of the working fluid from the high pressure chamber 85 of the pressure increasing mechanism 80 to the small diameter chamber 84 side, namely, the consumption of the accumulator pressure Pacc accumulated in the accumulator 32 by the pressure increasing mechanism 80 can be securely prevented, and the accumulator pressure Pacc can thus be supplied to the wheel cylinders 42RR and 42RL for the rear right and left wheels in a concentrated manner. In other words, the pressure increasing mechanism cut valve 90 is maintained in the closed state, the control pressure Px acquired by adjusting (increasing) the accumulator pressure Pacc by the pressure increasing linear control valve 65 can thus be supplied to the rear right and left wheels without wastefully reducing the accumulator pressure Pacc of the accumulator 32, and the appropriate braking forces can be generated.

On this occasion, in the brake device for a vehicle in this embodiment, as described above, the brake ECU 100 can control the respective pressure reducing valves 62 provided for the respective brake units 40 to shift to the open state, thereby reducing the wheel cylinder pressures in the respective wheel cylinders 42 in response to the release operation or the return operation of the brake pedal 10 by the driver. Further, the brake ECU 100 can control the respective pressure reducing valves 62 provided for the respective brake units 40 to shift to the open state in response to the release operation or the return operation of the brake pedal 10 by the driver, and, in addition, control the respective holding valves 61 to shift to the open state, thereby reducing the control pressure Px in the main flow passage 52 via the respective pressure reducing valves 62. Thus, the brake ECU 100 can quickly decrease the braking forces by the brake unit 40 in response to the return operation on the brake pedal 10 by the driver and the release operation on the brake pedal 10 of canceling the braking request.

Incidentally, for example, the brake ECU 100 can independently operate the respective holding valves 61 and the pressure reducing valves 62 so as to open or close, thereby independently controlling the wheel cylinder pressures in the respective wheel cylinders 42 based on the wheel speeds Vx detected by the wheel speed sensor 106 while the antiskid control is carried out in the linear control mode. Therefore, for example, as illustrated in FIG. 5, based on the antiskid control, the brake ECU 100 can realize such control that the holding valves 61FR and 61FL are maintained in the closed state, and the pressure reducing valves 62FR and 62FL are maintained in the open state, thereby reducing the wheel cylinder pressures in the wheel cylinders 42FR and 42FL for the brake units 40FR and 40FL for the front right and left wheels, and the holding valves 61RR and 61RL are maintained in the open state, and the pressure reducing valves 62RR and 62RL are maintained in the closed state, thereby increasing the wheel cylinder pressures in the wheel cylinders 42RR and 42RL for the brake units 40RR and 40RL for the rear right and left wheels.

Figure 5:
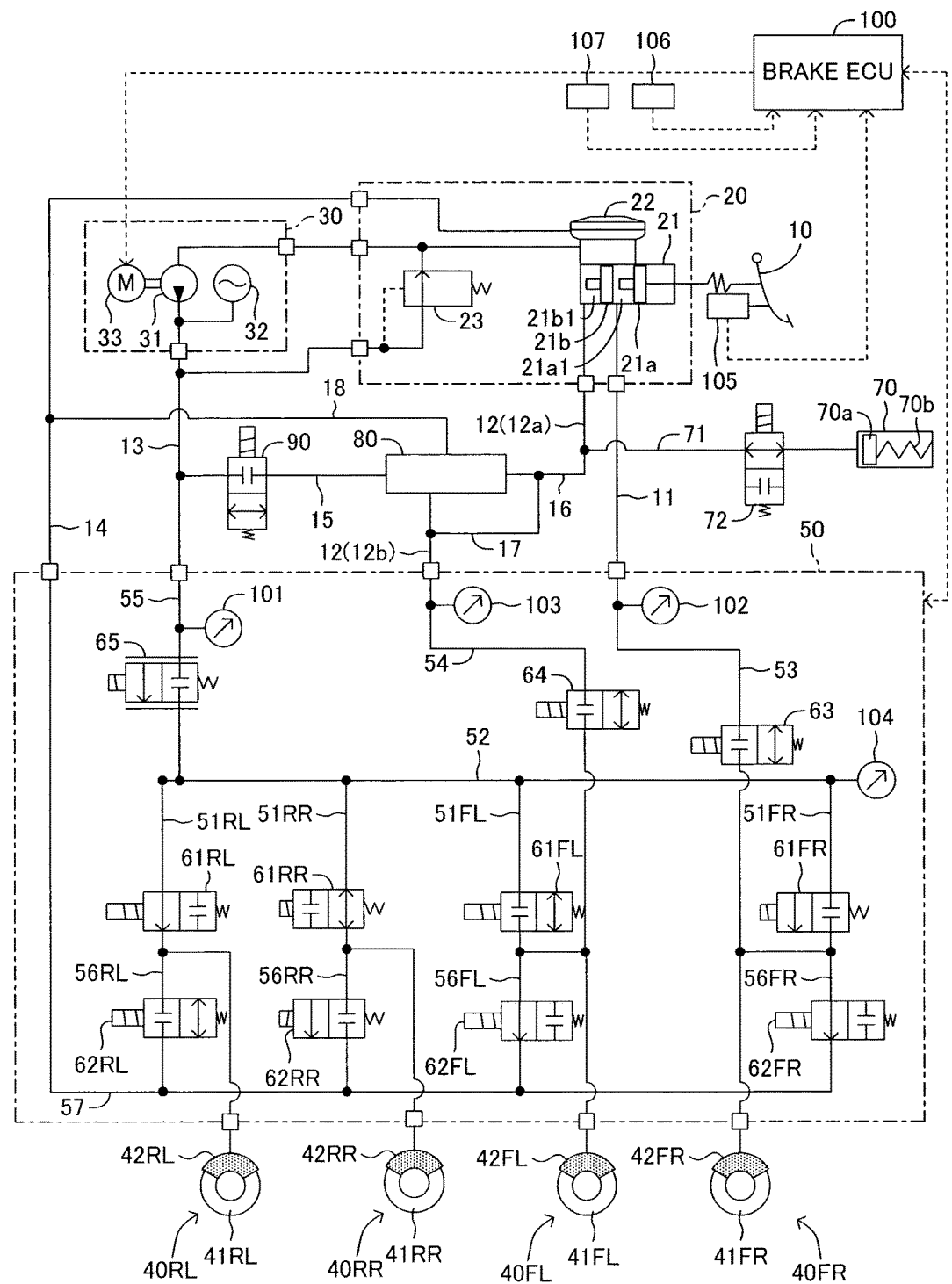
FIG. 5 is a diagram illustrating a return operation during antiskid control by the brake device for a vehicle according to the embodiment of the present invention.

When the operation toward the return direction or the release operation of the brake pedal 10 by the driver is carried out in this state, and, as described above, the respective holding valves 61 and the pressure reducing valves 62 are simply controlled to shift to the open state, as illustrated in FIG. 5, under a state in which the wheel cylinder pressures in the wheel cylinders 42FR and 42FL for the front right and left wheels are controlled to be in low pressures based on the antiskid control, the high control pressure Px is transmitted from the main flow passage 52 to the wheel cylinders 42FR and 42FL for the rear right and left wheels. As a result, the wheel cylinder pressures are temporarily increased in the wheel cylinders 42FR and 42FL, and useless braking forces may be generated on the front right and left wheels.

It is not preferred that the wheel cylinder pressures in the respective wheel cylinders 42 fluctuate toward the high pressure side by the control pressure Px transmitted from the main flow passage 52 in response to the return operation or the release operation of the brake pedal by the driver under the state in which the antiskid control is carried out. Thus, under the state in which the opening/closing operations of the respective holding valves 61 and the respective pressure reducing valves 62 are controlled based on the antiskid control, when the return operation or the release operation of the brake pedal 10 is carried out by the driver, the brake ECU 100 suppresses transmission of the control pressure Px in the main flow passage 52 in a high pressure state to the wheel cylinders 42 controlled to maintain the low pressures, which causes fluctuations in the wheel cylinder pressures toward the high pressure side.

Specifically, under the state in which the antiskid control is carried out, when the return operation or the release operation of the brake pedal 10 is carried out by the driver, the brake ECU 100 inhibits the holding valves 61 which are currently in the closed state from shifting to the open state, and maintains the holding valves 61 which are currently in the open state still in the open state. Then, the brake ECU 100 controls the pressure reducing valves 62 provided on the pressure reducing individual flow passages 56 (hereinafter also referred to as brake systems) connected to the individual flow passages 51 on which the holding valves 61 maintained in the open state are provided, that is, the pressure reducing valves 62 provided in correspondence to the holding valves 61 maintained in the open state into the open state.

On this occasion, when the brake ECU 100 determines whether or not the holding valve 61 is in the open state, the brake ECU 100 determines (selects) a holding valve 61 which is controlled to be in the open state for a predetermined period or more as the holding valve 61 in the open state. In other words, when the period in which the holding valve 61 is controlled to be in the open state is less than the predetermined period, the communication of the working fluid from the main flow passage 52 is obstructed by the influence of the pressure loss (orifice) in the holding valve 61, and the control pressure Px in the main flow passage 52 may not be appropriately decreased. Thus, the predetermined period is set to such a period that the influence of the pressure loss (orifice) is no longer exerted, and the brake ECU 100 determines (selects) the holding valve controlled to be in the open state for the predetermined period or more as the holding valve 61 in the open state, and determines a holding valve controlled to be in the open state only for a period less than the predetermined period as the holding valve 61 not in the open state.

A specific description is now given while referring to FIG. 5. Based on the antiskid control, the brake ECU 100 currently maintains the holding valves 61FR and 61FL provided for the brake systems for the front right and left wheels in the closed state, maintains the pressure reducing valves 62FR and 62FL in the open state, and realizes such control that the wheel cylinder pressures in the wheel cylinders 42FR and 42FL are lower than the control pressure Px in the main flow passage 52. On the other hand, based on the antiskid control, the brake ECU 100 maintains the holding valves 61RR and 61RL provided for the brake systems on the rear right and left wheel sides in the open state, maintains the pressure reducing valves 62RR and 62RL in the closed state, and realizes such control that the wheel cylinder pressures in the wheel cylinders 42RR and 42RL match the control pressure Px in the main flow passage 52.

In this state, when the operation toward the return direction or the release operation of the brake pedal 10 is carried out by the driver, the brake ECU 100 inhibits the holding valves 61FR and 61FL in the closed state on the front right and left wheel sides from shifting to the open state. As a result, the inflow of the working fluid from the main flow passage 52, namely, the transmission of the control pressure Px to the wheel cylinders 42FR and 42FL controlled to have the wheel cylinder pressures lower than the control pressure Px is shut off. Thus, the braking forces applied by the wheel cylinders 42Fr and 42FL to the front right and left wheels do not fluctuate.

Moreover, when the operation toward the return direction or the release operation of the brake pedal 10 is carried out by the driver, the brake ECU 100 maintains the holding valves 61RR and 61RL on the rear right and left wheel sides, which are in the open state, in the open state, and controls the pressure reducing valves 62RR and 62RL on the rear right and left wheel sides, which are in the closed state, to shift to the open state. In this case, the brake ECU 100 controls the pressure reducing valves 62RR and 62RL to be in the open state so as to attain wheel cylinder pressures in the wheel cylinders 42RR and 42RL on the rear right and left wheel sides, which can be determined, for example, in correspondence to the operation amount of the brake pedal 10 toward the return direction by the driver. As a result, the holding valves 61RR and 61RL are in the open state, and the control pressure Px in the main flow passage 52 is thus decreased via the pressure reducing valves 62RR and 62RL as the pressures decrease in the wheel cylinders 42RR and 42RL. Thus, the wheel cylinders 42Fr and 42FL controlled to match the control pressure Px via the holding valves 61RR and 61RL in the open state decrease the braking forces applied to the rear right and left wheels without fluctuations in response to the opening of the pressure reducing valves 62RR and 62RL.

As appreciated from the above description, when the brake pedal 10 on which the driver has carried out the depressing operation is operated toward the return direction during the antiskid control, the holding valves 61 in the closed state can be inhibited from shifting to the open state. As a result, the high hydraulic pressure is securely prevented from being transmitted to the wheel cylinders 42 controlled to have low pressures by maintaining the holding valves 61 in the closed state by the antiskid control. Thus, the braking forces applied by the wheel cylinders 42 are securely prevented from fluctuating on the wheels for which the holding valves 61 are maintained in the closed state, and the driver can acquire satisfactory brake operation feeling.

On the other hand, when the brake pedal 10 on which the driver has carried out the depressing operation is operated toward the return direction during the antiskid control, the holding valves 61 in the open state are still maintained in the open state, and the pressure reducing valves 62 provided in correspondence to the holding valves 61 are controlled to shift to the open state. As a result, the high control pressure Px in the main flow passage 52 on the upstream side with respect to the holding valves 61 is decreased via the holding valves 61 and the pressure reducing valves 62 in the open state. Thus, the control pressure Px has already been transmitted from the main flow passage 52 to the wheel cylinders 42 on the wheels for which the holding valves 61 are maintained in the open state, and the control pressure Px (=wheel cylinder pressures) in the main flow passage 52 and the wheel cylinders 42 can be quickly decreased by controlling the corresponding pressure reducing valves 62 to be in the open state. As a result, the braking forces applied by the wheel cylinders 42 can be quickly released without fluctuations in the braking forces, resulting in the driver gaining satisfactory brake operation feeling.

MODIFIED EXAMPLE

In the above-mentioned embodiment, as illustrated in FIG. 5, a description is given of a case in which the holding valves 61 in the open state and the holding valves 61 in the closed state exist. Incidentally, a state in which the wheel cylinder pressures in all the wheel cylinders 42 are maintained, that is, a state in which all the holding valves 61 are maintained in the closed state can be generated based on the antiskid control as described above. Thus, it is important to efficiently suppress the fluctuations in the braking forces applied by the wheel cylinders 42, thereby enabling the driver to sense satisfactory brake operation feeling also in this case.

Figure 6:
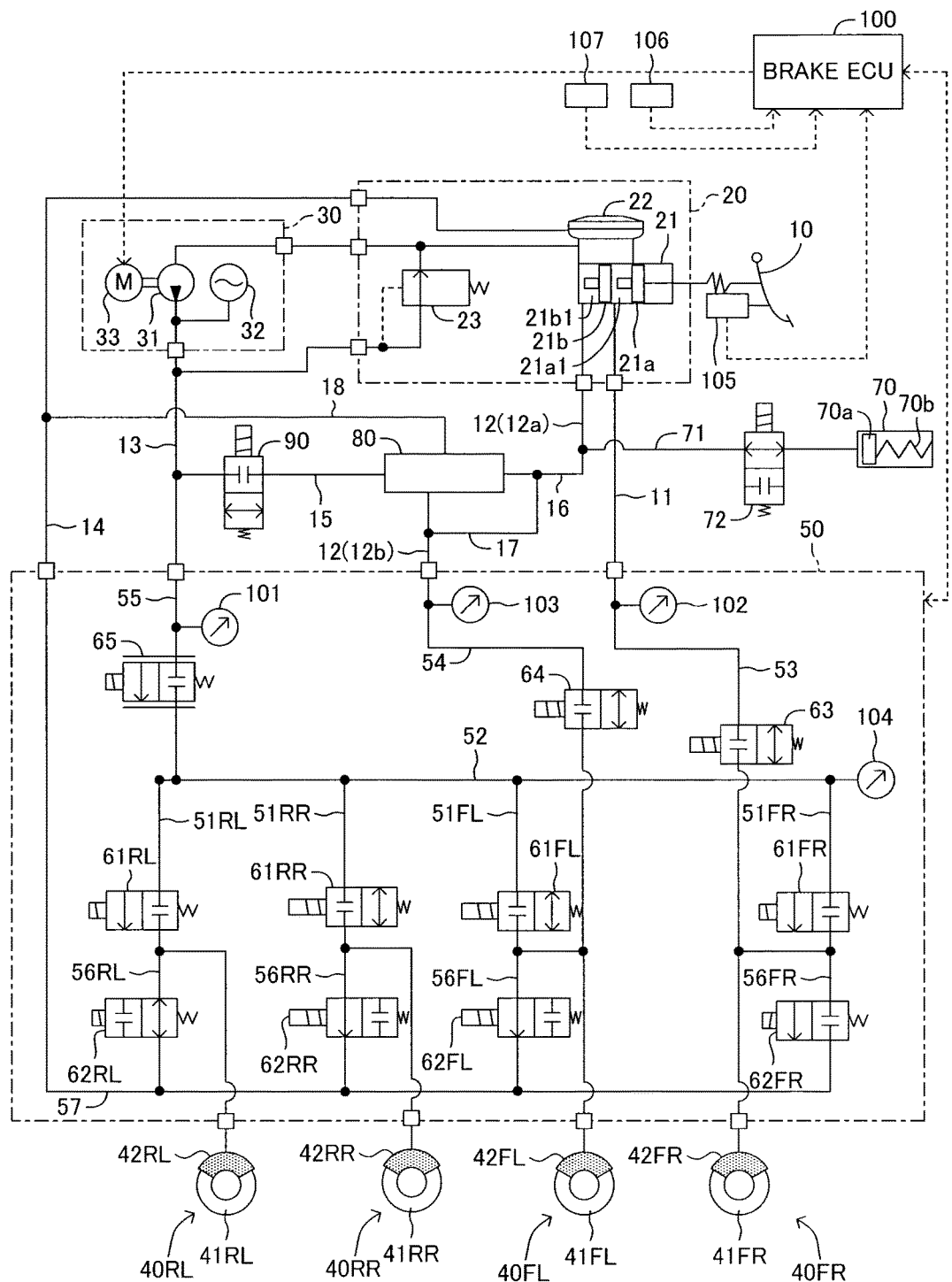
FIG. 6 is a diagram illustrating the return operation during the antiskid control by the brake device for a vehicle according to a modified example of the present invention.

Therefore, the brake ECU 100 selects a holding valve 61 that presents the smallest fluctuation generated in the braking force applied by the wheel cylinder 42 out of all the holding valves 61 in the closed state even when the all the holding valves 61 in the closed state are controlled to shift to the open state. Then, the brake ECU 100 controls the selected holding valve 61 to shift from the closed state to the open state, and controls the pressure reducing valve 62 in the brake system on which this holding valve 61 is provided to shift to the open state. Referring to FIG. 6, a specific description is now given of this modified example.

In this modified example, as illustrated in FIG. 6, the brake ECU 100 currently follows the antiskid control to maintain all the holding valves 61FR, 61FL, 61RR, and 61RL provided for the brake systems for the front/rear right/left wheels in the closed state. On the other hand, the brake ECU 100 follows the antiskid control to maintain the pressure reducing valves 62FL, 62RR, and 62RL provided on the brake systems excluding the front right wheel in the open state, and maintains the pressure reducing valve 62FR provided on the brake system for the front right wheel in the closed state.

Thus, in this modified example, the brake ECU 100 realizes such control that only the wheel cylinder pressure in the wheel cylinder 42FR in the brake system for the front right wheel is maintained, and the wheel cylinder pressures in the wheel cylinders 42FL, 42RR, and 42RL in the other brake systems are lower than the control pressure Px in the main flow passage 52. As a result, in this modified example, the wheel cylinder pressure in the wheel cylinder 42FR is controlled to be larger than the wheel cylinder pressures in the wheel cylinders 42FL, 42RR, and 42RL.

In this state, the brake ECU 100 selects the holding valve 61FR communicating to the wheel cylinder 42FR largest in the wheel cylinder pressure, and cancels the inhibition of the shift to the open state for the holding valve 61FR, thereby controlling the holding valve 61FR to shift to the open state. Moreover, the brake ECU 100 controls the pressure reducing valve 62FR provided in correspondence to the holding valve 61FR to shift to the open state along with the shift of the holding valve 61FR to the open state.

On this occasion, in a state in which all the holding valves 61 and all the pressure reducing valves 62 are maintained in the closed state and the wheel cylinder pressures in all the wheel cylinders 42 are maintained, the brake ECU 100 estimates the wheel cylinder pressures in all the wheel cylinders 42 based on, for example, the operation amount of the brake pedal 10 by the driver and the number of times of opening/closing operation (opening/closing operation amount) of the holding valves 61 and the pressure reducing valves 62. It should be understood that the wheel cylinder pressures may be directly detected in place of the estimation of the wheel cylinder pressures for embodiment. In this way, the brake ECU 100 can identify the wheel cylinder 42 having the maximum wheel cylinder pressure by acquiring the wheel cylinder pressures in all the wheel cylinders 42 to select the holding valve 61 communicating to this wheel cylinder 42.

Thus, according to this modified example, even in the state in which the high control pressure Px in the main flow passage 52 on the upstream side is transmitted, in the wheel cylinder 42 having the maximum wheel cylinder pressure, an increase in the wheel cylinder after the holding valve 61 is controlled to shift to the open state and the control pressure Px is transmitted is relatively small. Therefore, in the state in which the all the holding valves 61 are controlled to be in the closed state based on the antiskid control, when the brake pedal 10 on which the driver carried out the depressing operation is operated toward the return direction, the fluctuation ranges in the braking forces applied by the wheel cylinders 42 can be suppressed to small fluctuation ranges by controlling the holding valve 61 and the pressure reducing valve 62 communicating to the wheel cylinder 42 having the maximum wheel cylinder pressure to shift to the open state. As a result, the driver can gain satisfactory brake operation feeling.

In carrying out the present invention, the present invention is not limited to the respective embodiments and the respective modified examples described above, and different kinds of changes may be made thereto without departing from an object of the present invention.

For example, depending on a travel state of the vehicle, there may occur a state in which specific holding valves 61 and pressure reducing valves 62 are operated to reduce the control pressure Px in the main flow passage 52 and the wheel cylinder pressures in the wheel cylinders 42 as a result of the operation toward the return direction or the release operation on the brake pedal 10 by the driver. Then, for example, an influence by heat generation caused by the operation is concerned in this case. Thus, for example, the holding valves 61 and the pressure reducing valves 62 are switched for operation in sequence, or the holding valves 61 and the pressure reducing valves 62 low in temperature may be operated. Even in this case, the same effects as in the embodiment and the modified example can be expected.

Moreover, for example, when the operation toward the return direction or the release operation on the brake pedal 10 by the driver is quick, the number of the holding valves 61 and the pressure reducing valves 62 to be operated can be increased. As a result, the driver can sense an excellent responsiveness to the driver's own operation, and can gain satisfactory brake operation feeling.

Moreover, when the holding valves 61 and the pressure reducing valves 62 are operated, the holding valves 61 and the pressure reducing valves 62 provided on the vehicle right wheel side and the holding valves 61 and the pressure reducing valves 62 provided on the vehicle left wheel side may be operated so as to prevent a difference between the right and left wheel sides in braking force from being generated on the vehicle. As a result, a useless yaw (yaw rate) is prevented from being generated.

Moreover, when the holding valves 61 and the pressure reducing valves 62 are operated, holding valves 61 and pressure reducing valves 62 generating large operation sounds as a result of the opening/closing operation may be identified, and valves other than those holding valves 61 and the pressure reducing valves 62 may be preferentially operated. As a result, the unpleasant operations sounds may be less sensed by the driver (passengers).

Moreover, in the above-mentioned embodiment and modified example, the servo pressure output from the pressure increasing mechanism 80 is directly transmitted to the wheel cylinder 42FL for embodiment. In this case, the servo pressure may be transmitted from the pressure increasing mechanism 80 to the master cylinder 21 for embodiment. In this case, specifically, a hydro booster is provided for the master cylinder 21, and the servo pressure is supplied to the hydro booster from the pressure increasing mechanism 80. As a result, the master cylinder 21 can transmit the hydraulic pressures corresponding to the servo pressure to, for example, the wheel cylinder 42FL via the master cylinder 21. Thus, the same effects as those in the above-mentioned embodiment and modified example can be expected.

Further, when the initial check is carried out in the embodiment and modified example, operation sounds caused by the switching operations of the respective electromagnetic on-off valves may be generated. Therefore, for example, if the vehicle is an HV or a PHV, the initial check may be carried out when the rpm of an internal combustion engine is equal to or more than a predetermined rpm, or if the vehicle is an EV, the initial check may be carried out when a sound volume of an audio device is equal to or more than a predetermined sound volume. As a result, the operation sounds generated during the initial check can be mixed with a sound generated by the internal combustion engine or may be mixed with a sound generated from the audio device, and thus the operation sounds may be less sensed by the occupants.

The invention claimed is:

1. A brake device for a vehicle, comprising:
a master cylinder for generating a hydraulic pressure in response to an operation by a driver on a brake pedal;
a power hydraulic pressure source for generating a hydraulic pressure through drive of a pressure pump;
a valve mechanism comprising a plurality of electromagnetic valves to be controlled by electric signals, for carrying out transmission of the hydraulic pressure output from the master cylinder or the power hydraulic pressure source;
a wheel cylinder for applying a braking force to each of wheels through the transmission of the hydraulic pressure output from the master cylinder or the power hydraulic pressure source via the valve mechanism; and
control means for controlling an operation of the valve mechanism,
the valve mechanism comprising:
holding valves, which each comprise an electromagnetic on-off valve, provided for the respective wheels so as to realize at least communication or shutoff between an upstream side to which the hydraulic pressure is transmitted from the power hydraulic pressure source and a downstream side to which the wheel cylinder is connected;
pressure reducing valves, which each comprise an electromagnetic on-off valve, provided in correspondence to the respective holding valves so as to realize at least communication or shutoff between the wheel cylinder and a reservoir; and
a pressure increasing valve, which comprises an electromagnetic valve, for increasing the hydraulic pressure on the upstream side by using the hydraulic pressure from the power hydraulic pressure source,
the control means being configured to, during antiskid control for suppressing an excessive slip in a longitudinal direction of a wheel to which the braking force is applied, when the brake pedal subjected to a depressing operation is operated toward a return direction by the driver:
inhibit, out of the holding valves provided for the respective wheels, the holding valve controlled to be in a closed state based on the antiskid control from shifting to an open state; and
control the pressure reducing valve provided in correspondence to the holding valve in the open state based on the antiskid control to shift to an open state.

2. A brake device for a vehicle according to claim 1, wherein when the control means controls all the holding valves to be in the closed state based on the antiskid control, the control means cancels the inhibition of the shift to the open state in the holding valve provided for the wheel having the maximum hydraulic pressure in the wheel cylinder, and controls the corresponding holding valve to shift to the open state.

3. A brake device for a vehicle according to claim 2, wherein the control means estimates the hydraulic pressure in the wheel cylinder for each of a front right wheel, a front left wheel, a rear right wheel, and a rear left wheel of a vehicle, and selects, based on the estimated hydraulic pressure, the holding valve provided for the wheel having the maximum hydraulic pressure in the wheel cylinder.

4. A brake device for a vehicle according to claim 1, wherein the holding valve in the open state is the holding valve controlled to be in the open state for a predetermined period or more.

5. A brake device for a vehicle according to claim 1, wherein, during an abnormal state in which there is a possibility of a leak of a working fluid in any of brake systems for transmitting the hydraulic pressure from the power hydraulic pressure source to the wheel cylinders provided on a front right wheel, a front left wheel, a rear right wheel, and a rear left wheel of a vehicle, the control means controls the holding valves to be in the open state so as to maintain the communication between the wheel cylinders provided on rear right and left wheel sides of the vehicle and the power hydraulic pressure source, and controls the holding valves to be in the closed state so as to shut off the communication between the wheel cylinders provided on front right and left wheel sides of the vehicle and the power hydraulic pressure source and to transmit at least the hydraulic pressure from the master cylinder to the wheel cylinders provided on the front right and left wheel sides of the vehicle.

6. A brake device for a vehicle according to claim 1, further comprising a pressure increasing mechanism connected to the master cylinder and the power hydraulic pressure source, for generating a hydraulic pressure having a predetermined ratio with respect to the master cylinder by using the hydraulic pressure from the power hydraulic pressure source.

7. A brake device for a vehicle according to claim 6, wherein the pressure increasing mechanism is mechanically operated by the hydraulic pressure output from the master cylinder in response to the operation by the driver on the brake pedal.

* * * * *